US006408406B1

(12) United States Patent
Parris

(10) Patent No.: US 6,408,406 B1
(45) Date of Patent: Jun. 18, 2002

(54) HARD DISK DRIVE INFANT MORTALITY TEST

(75) Inventor: Craig A. Parris, Prior Lake, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/387,677

(22) Filed: Aug. 31, 1999

(51) Int. Cl.⁷ .................................................. G06F 11/00
(52) U.S. Cl. .............................. 714/41; 714/42; 714/54
(58) Field of Search ............................. 714/25, 32, 33, 714/36, 42, 40, 47, 37, 38, 54, 723, 718, 719, 736; 702/182, 183, 187

(56) References Cited

U.S. PATENT DOCUMENTS

| 5,615,335 A | * | 3/1997 | Onffroy et al. | ........ 395/183.06 |
| 6,097,206 A | * | 8/2000 | Takano | ........................ 714/723 |
| 6,154,858 A | * | 11/2000 | Ottesen et al. | ................. 714/42 |
| 6,281,676 B1 | * | 8/2001 | Ottesen et al. | .............. 324/212 |

* cited by examiner

Primary Examiner—Robert Beausoleil
Assistant Examiner—Marc Duncan
(74) Attorney, Agent, or Firm—Milad G Shara, Esq.

(57) ABSTRACT

A functional test for determining whether a hard disk drive has experienced an early-life failure. The test retrieves values of a selected set of stored historical performance parameters of the hard disk drive, then compares the retrieved values against a set of associated performance thresholds. If any of the selected set of stored historical performance parameters exceeds the associated performance threshold, the hard disk drive is marked as defective. The test also performs a set of non-destructive read/write tests to selected regions of the hard disk drive, generating a set of results. The non-destructive read/write test results are then compared against an associated performance threshold. If the results of the non-destructive read/write tests exceed the associated performance threshold, the hard disk drive is marked as defective. If neither the hard disk drive's historical performance parameters nor the results from the read/write tests exceed the associated performance thresholds, the hard disk drive is marked as functional.

20 Claims, 9 Drawing Sheets

HARD DISK DRIVE INFANT MORTALITY TEST

BACKGROUND OF THE INVENTION

1. Field of the Invention

The present invention relates to hard disk drives. More particularly, the present invention relates to a functional test for determining whether a hard disk drive has experienced an early-life failure, or may fail in the near future.

2. Description of the Related Art

Hard disk drives store large volumes of data on one or more disks mounted on a spindle assembly. Disk drives employ a disk control system for interfacing with a host (e.g., a computer) to control the reading and writing of data on a disk. Each disk includes at least one disk surface which is capable of storing data. On each disk surface, user data is stored in concentric circular tracks between an outside diameter and an inside diameter of the disk.

As a result of the manufacturing process, defective data sites may exist on the disk surfaces of the disk drive. These defective data sites are termed "prior defects". A defect discovery procedure is performed to locate these defects and mark them out as defective locations on the disk surface which are not available for use. A typical defect discovery procedure includes writing a known data pattern to the disk surface and subsequently reading the data pattern from the disk surface. Defective data sites are identified by comparing the data pattern read from the disk surface with the known data pattern written to the disk surface.

Following the defect discovery procedure, defective data sites are put in a prior defect list which is stored in a table. The prior defect list is used during formatting of the disk surface to generate a defect management table. Within the defect management table, the defective data sites may be mapped to data sector locations (cylinder number, head number, and data sector number). Once identified in the defect management table, the defective data sectors may not be used for storing data.

Defective data sites encountered after formatting the disk surface are known as "grown defects". Grown defects often occur in locations adjacent to defective data sites found during defect discovery. Grown defects are also listed in a table, similar to that utilized by the "prior defects". The number of sites marked out on a disk drive as "defective data sites" is used as a measure of the quality of the disk drive. Upon interrogation by a host, the disk drive will report the defect list generated in the defect management table.

Defects such as "prior defects" and "grown defects" are known as hard sector errors. A hard sector error is essentially permanent in nature, thus the sector cannot be recovered. A disk may also contain transient or "soft" errors. A transient error is defined as an error or defect which clears over a period of time. For example, a transient error may occur due to a thermal asperity on the disk surface. A retry mode may be entered, wherein the command is retried a number of times allowing sufficient time to pass for the transient error to clear. Transient errors are also logged on the drive as they occur.

A common problem encountered by disk drive manufacturers is the improper diagnosis of disk drive failures in customer systems. In many instances, functional disk drives improperly diagnosed as defective by customers are unnecessarily returned to the manufacturer, resulting in down time for the customer as well as extra expense to the manufacturer to diagnose the disk. The problem of improper diagnosis of disk failures is particularly acute in drives that are relatively new (e.g., fewer than 600 power-on hours).

Test suites presently exist for testing the condition of a disk drive. These test suites exhaustively test all locations on the surface of the disk for failures. Unfortunately, these test suites require extensive run time (often 30 minutes or longer), and often require special expertise to activate proprietary modes within the disk drive. Therefore, such test suites are rarely used by end customers to diagnose drive problems. Additionally, since such test suites read, write, and verify essentially all storage sites on the disk, such tests will become even slower as disk capacities increase in the future. Finally, test suites may affect customer data stored on the disk drive.

It is desirable to have a functional test for customers to quickly and easily diagnose early-life disk drives in customer systems when a disk failure is suspected, in order to prevent the customer return of properly functioning disk drives. The time required for performing the functional test should be independent of the capacity of the hard disk drive. The functional test should utilize both historical performance parameters (such as "hard" and "soft" errors and "prior" and "grown" defects) continually logged on the disk, and active read/write/verify operations to the most susceptible/critical data sites on the disk in order to determine the operating condition of the disk. Finally, the functional test should not disturb customer data while testing the surface of the disk.

SUMMARY OF THE INVENTION

The present invention provides a method of functionally testing a potentially defective disk drive having data sites on a disk for recording data thereon. During the operation of the disk drive, the disk drive stores a plurality of historical performance parameters for continuously logging operational problems.

The method begins by performing an analysis of the stored historical performance parameters. A set of performance thresholds associated with each of the plurality of stored historical performance parameters is defined. Next the stored plurality of historical performance parameters is retrieved, and each of the plurality of historical performance parameters is compared against its associated performance threshold. If the value of the historical performance parameter exceeds the associated performance threshold, the disk drive is marked as a failed disk drive.

If none of the performance thresholds are exceeded, the method next performs a set of non-destructive read/write tests to selected regions of the disk. A set of performance thresholds associated with each of the set of non-destructive read/write tests is defined. Next, the set of non-destructive read/write tests is run, generating a set of results. The results of each of the non-destructive read/write tests is then compared against the associated performance threshold. If the results of the non-destructive read/write tests exceed: the associated performance threshold, the disk drive is marked as a failed disk drive.

In one embodiment of the present invention, the functional testing method retrieves a power-on time parameter value from the disk drive, compares the power-on time parameter value against a user defined threshold value and if the power-on time parameter value exceeds the user defined threshold value, the functional test is terminated. The power-on time parameter value is set to 600 hours in a preferred embodiment of the present invention.

The functional testing method of the present invention issues commands to the disk drive which are compliant with SCSI-3 specifications. The plurality of historical parameters used by the present invention include: counts of soft error rates and reassignments, counts of corrected and uncorrected errors encountered during read, write, and :verify operations to the disk drive, and the number of entries found in the grown defect list (GLIST).

The set of non-destructive read/write tests include: a read/write test of a known pattern to all disk drive heads in a non-customer data area, a verification test of the first 100 megabytes of data on the disk drive, and a series of random inner diameter zone region/outer diameter zone region read and seek tests. The series of random inner diameter zone region/outer diameter zone region read and seek test includes a random read operation to an inner diameter zone. region logical block address (LBA), followed by a random read operation of an outer diameter zone region LBA, followed by a seek to a random inner diameter zone region LBA, followed by a seek to a random outer diameter zone region LBA. The inner diameter zone region of the disk drive is defined by the range of logical block addresses (LBA's) from (maximum LBA/8)*5 to maximum LBA. The outer diameter zone region of:the disk drive is defined by the range of logical block addresses from 0 to (maximum LBA/8). The present invention provides a function for obtaining the data capacity and maximum logical block address (LBA) of the disk drive under test.

The amount of time required to perform the functional test of the present invention is independent of the capacity of the drive. In one embodiment of the present invention, the amount of time required to functionally test a disk drive is approximately two minutes.

In one embodiment of the present invention, the functional testing method retrieves a manufacturer name from the disk drive, compares the retrieved manufacturer name against one or more user supplied manufacturer names, and terminates the functional test if the retrieved manufacturer name does not match any of the one or more user supplied manufacturer names.

In one embodiment of the present invention, the functional test resides in software. In an alternate embodiment, the functional test resides in firmware within the disk drive. The functional test of the present invention operates on SCSI disk drives.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the: invention. Within the drawings, like numbers designate like elements.

DETAILED DESCRIPTION

Figure 1:
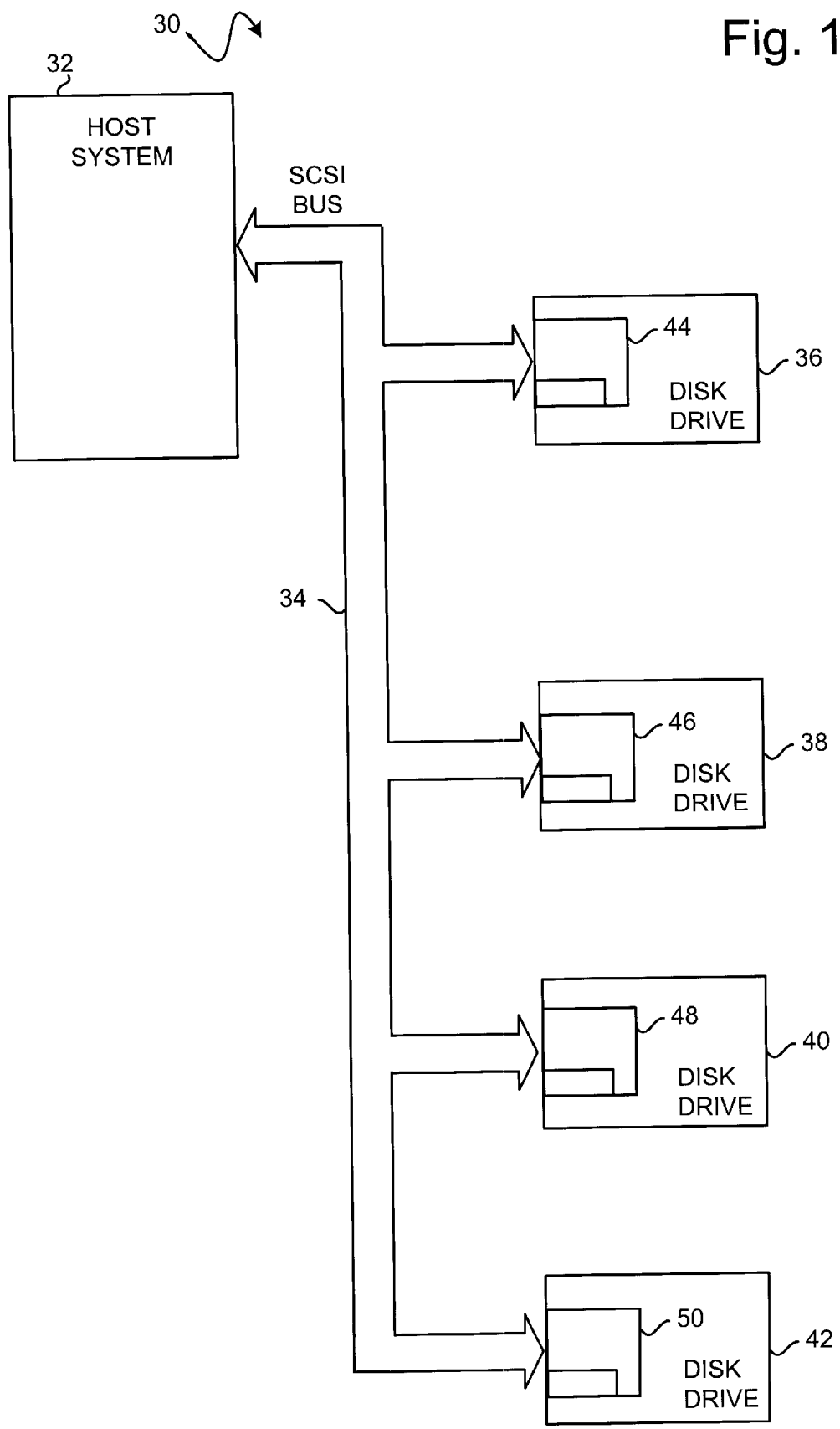
FIG. 1 is a block diagram illustrating one exemplary embodiment of a hard disk drive system having a SCSI bus interface employing a functional test in accordance with the present invention.

A hard disk drive system having a SCSI bus interface is illustrated generally at 30 in FIG. 1. SCSI disk drive system 30 employs a method for analyzing disk drive failures in accordance with the present invention. The method is a predictive failure analysis which includes a fast analysis of both disk drive logged historical operation: data and an active test procedure without disturbing user data stored on the disk drive.

SCSI disk drive system 30 includes multiple devices (e.g., hard disk drives) and a host logically connected to a common SCSI bus. In particular, SCSI disk drive system 30 includes a host system 32, a SCSI bus 34, and a disk drive target 36, a disk drive target 38, a disk drive target 40, and disk drive target 42. Host system 32, disk drive targets 36, 38, 40, and 42 are each connected to the SCSI bus 34, and accordingly, communicate with each other via the SCSI bus 34. It is recognized that other devices or peripherals may also be connected to the SCSI bus 34. Host system 32 can include a microprocessor based data processing system such as a personal computer, or other system capable of performing a sequence of logical operations. Data is transmitted between the host system 32 and disk drive targets 36, 38, 40, 42 via the SCSI bus 34. SCSI bus 34 is defined as an industry standard SCSI bus for connecting multiple. devices to a common bus (e.g., SCSI-1, SCSI-2, or SCSI-3). in one exemplary embodiment, SCSI bus 34 uses a SCSI-3 bus protocol and hardware interface to allow host system 32 and disk drive targets 36, 38, 40, and 42 to communicate across the same bus, as known to those skilled in the art. The entire contents of the SCSI-3 bus standard specifications from the ANSI T10 technical committee are incorporated herein by reference.

Each disk drive target 36, 38, 40, 42 include a SCSI or "host interface" controller 44, 46, 48, 50. Each SCSI controller 44, 46, 48, 50 is connected to SCSI bus 34 allowing host system 32 to communicate with corresponding disk drive targets 36, 38, 40, 42. As will be described in detail herein, historical performance parameters are logged on a disk surface of disk drive targets 36, 38, 40, 42. These historical performance parameters include running logs of both recoverable and non-recoverable errors encountered during operation of the disk drive targets 36, 38, 40 42.

Figure 2:
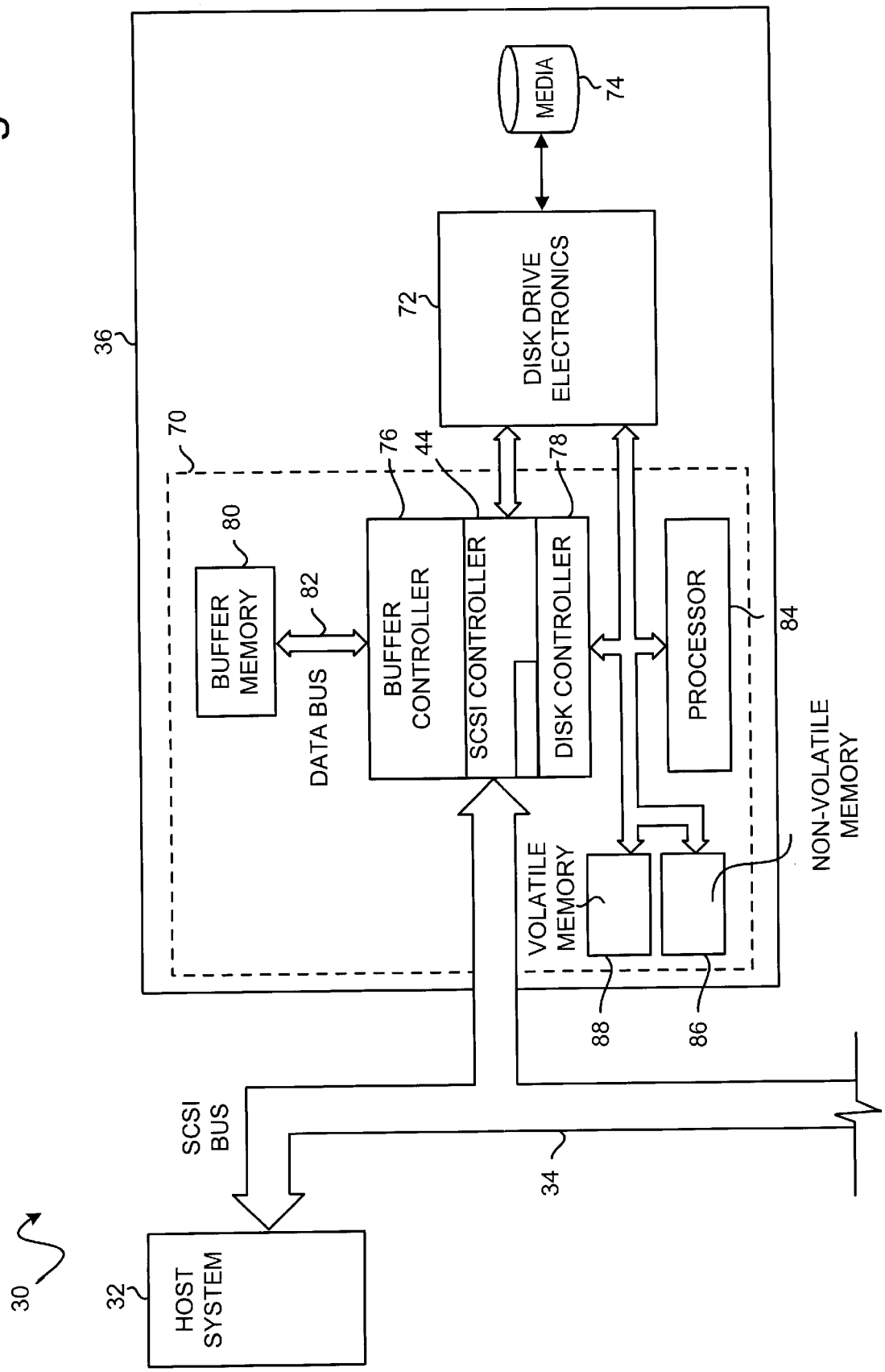
FIG. 2 is a block diagram illustrating one exemplary embodiment of a host initiator and disk drive target in accordance with the present invention.

In FIG. 2, a block diagram illustrating one preferred embodiment of target disk drive 36 is shown. Although only target disk drive 36 is described in detail, disk drives 38, 40, 42, are similar to disk drive 36 as detailed herein.

Disk drive 36 includes an interface disk control system 70, disk drive electronics 72, and media 74. Interface disk control system 70 and disk: drive electronics 72 provide an intelligent disk control system interface and disk drive electronics for execution of read and write commands at media 74, Media 74 comprises one or more disk surfaces as known to those skilled in the art.

Interface disk control system 70 includes SCSI controller 44, a buffer controller 76 and a disk controller 78. SCSI controller 44 communicates with host system 32 via SCSI bus 34 by receiving commands and data from and transmitting status and data back to host system 32. Buffer controller 76 controls a buffer memory 80 employed for storing data via data bus 82 from host system 32 which is to be written to media 74. In addition, buffer controller 76 controls buffer memory 80 for storing data read from media 74. Buffer memory 80 typically comprises volatile memory, such as dynamic random access memory (DRAM). Disk controller 78 sends data to and receives data from a read/write channel located in the disk drive electronics 72, as know to those skilled in the art. Disk controller 78 also provides for error correction and error detection on data read from media 74.

An interface processor 84 handles the flow of data commands received by SCSI controller 44 by sending commands to and reading status from disk controller 78. Interface processor 84 ascertains which commands to process from host system 32 and when to process these commands, and directs other tasks performed by disk controller 78. Disk drive control system operational programs are stored in non-volatile memory 86, which may be read-only memory (ROM) or flash memory. Alternatively, system operational programs maybe stored on media 74. Upon start-up of disk drive 36, disk drive programs, such as the servo operational programs, are transferred into volatile memory 88 for fast access by the disk drive electronics 72 for execution of read and write commands.

The functional test program of the present invention may reside in software on host system, or in firmware on the disk drive itself (i.e., non-volatile memory 86). Each disk surface of media 74 includes a user data band and a reserved band, wherein a written data track in the reserved band is centered in approximate alignment with a corresponding servo track centerline. During operation of disk drive 36, historical performance parameters are continuously logged to the reserved area of the media 74. Such parameters include: a grown defect list, a read error counter log, a write error counter log, a verify error counter log, and other disk performance attributes.

Figure 3:
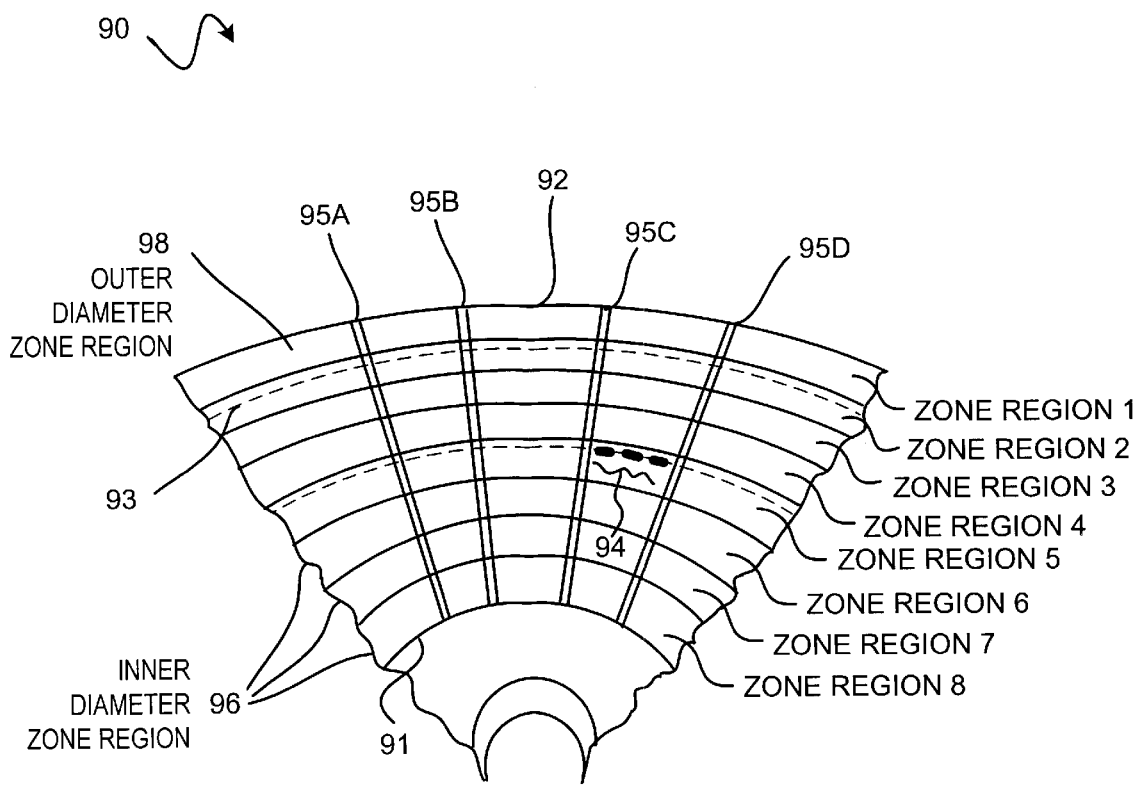
FIG. 3 is an illustration of a portion of a data surface of a hard disk drive, showing zone regions on the disk.

FIG. 3 is a plan view of a data surface of a hard disk drive, showing zone regions located within the data surface. A disk surface 90 includes an inner boundary 91 and an outer boundary 92 defining an annular area suitable for the recording and reproduction of data. Data is stored on concentric tracks, such as indicated by 93, between inner boundary 91 and outer boundary 92. Recorded information (i.e. user data) on the disk surface 90 is divided into regions or groups of data sectors 94. Embedded servo information is recorded in servo sectors or servo "wedges" placed in radially continuous narrow regions (termed "servo sectors") indicated at 95A, 95B, 95C, and 95D located between groups of data sectors 94. Each data sector 94 has an associated logical block address (LBA).

Figure 4:
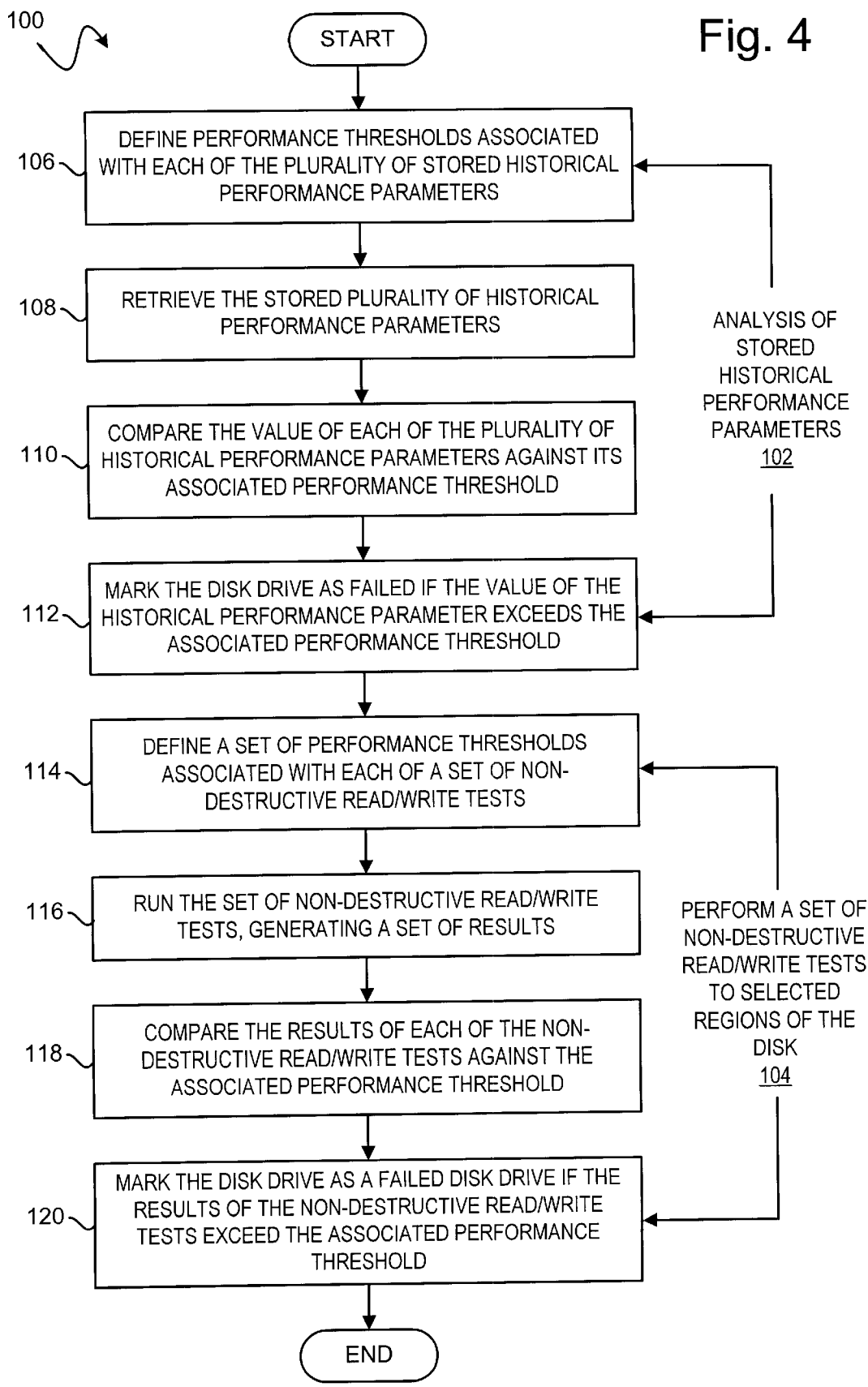
FIG. 4 is a flow chart illustrating one exemplary embodiment of a method of functionally testing a potentially defective drive in accordance with the present invention.

Groups of adjacent data tracks 93 are assigned to a plurality of zone regions between the inner boundary 91 and the outer boundary 92. In the illustrated embodiment, disk surface 90 has been partitioned into eight zone regions, illustrated by zone boundaries, labeled zone region 1, zone region 2, zone region 3, zone region 4, zone region 5, zone region 6, zone region 7, and zone region 8. Disk surface may be partitioned into any desirable, usable number of zone regions. It has been determined that the two areas of the disk most susceptible to errors are an inner diameter zone region 96 of the disk and an outer diameter zone region 98 of the disk. The inner diameter zone region 96 is defined as the innermost three-eighths of the LBA's present on disk surface 90 (e.g., (maximum LBA/8)*5 to maximum LBA)). In the illustrated embodiment, inner diameter zone region 96 includes zone region 6, zone region 7, and zone region 8. The outer diameter zone region 98 is defined as the outermost one-eighth of the LBA's present on disk surface 90 (e.g., (LBA 0 to (maximum LBA/8)). In the illustrated embodiment, outer diameter zone region 98 includes zone region 1. FIG. 4 is a block diagram illustrating the method of functionally testing a potentially defective disk drive in accordance with the present invention, shown generally at 100. The method tests the disk drive by analyzing stored historical performance parameters, as shown at 102, and performing a set of non-destructive read/write tests to selected regions of the disk, as shown at 104. The stored historical performance parameters and set of non-destructive read/write tests are described in further detail in FIG. 5.

At block 106, the method begins by defining performance thresholds associated with each of the plurality of stored historical performance parameters. At block 108 the stored plurality of historical performance parameters is retrieved from the disk drive. The method next compares the value of each of the plurality of historical performance parameters against its associated performance threshold, as shown at block 110. At block 112, the disk drive is marked as failed if the value of the historical performance parameter exceeds the associated performance threshold, and the functional test is terminated. If the value of the historical performance parameter does not exceed the associated performance threshold, a set of performance thresholds associated with each of a set of non-destructive read/write tests is defined, as shown at block 114. At block 116, the set of non-destructive read/write tests is run on the disk drive, generating a set of results. At block 118, the result of each of the non-destructive read/write tests is compared against the associated performance threshold. If the results of any of the non-destructive read/write tests exceed their associated performance threshold, the disk drive is marked as a failed disk drive, as shown at block 120.

Unlike prior art functional tests, the present invention writes a fixed amount of data to the drive under test, regardless of the capacity of the disk under test. Thus, the execution time of the functional test of the present invention remains constant for all hard drives tested. In one embodiment of the present invention, the functional test executes in approximately two minutes. This execution time of the functional test of the present invention is as much as an order of magnitude less than the time required to functionally test the entire surface of a disk, as is required by prior art functional testing systems.

In one embodiment of the present invention, the functional test of the present invention is software that resides on a removable, computer readable medium such as a floppy disk, a CD-ROM, or a disk cartridge. In this embodiment, a user inserts the removable, computer readable medium into host system (FIG. 1, element 32) and executes a command to begin the functional test. During execution of the functional tests, SCSI-3 compatible commands are issued across SCSI bus 34 to SCSI hard drives 36, 38, 40 and 42 present on the SCSI bus.

In another embodiment of the present invention, the function test of the present invention resides in firmware embedded within the disk drive. In this embodiment, a user on host system 32 issues a command to the firmware on hard drive 36, 38, 40, 42 to begin the functional test.

Figure 5:
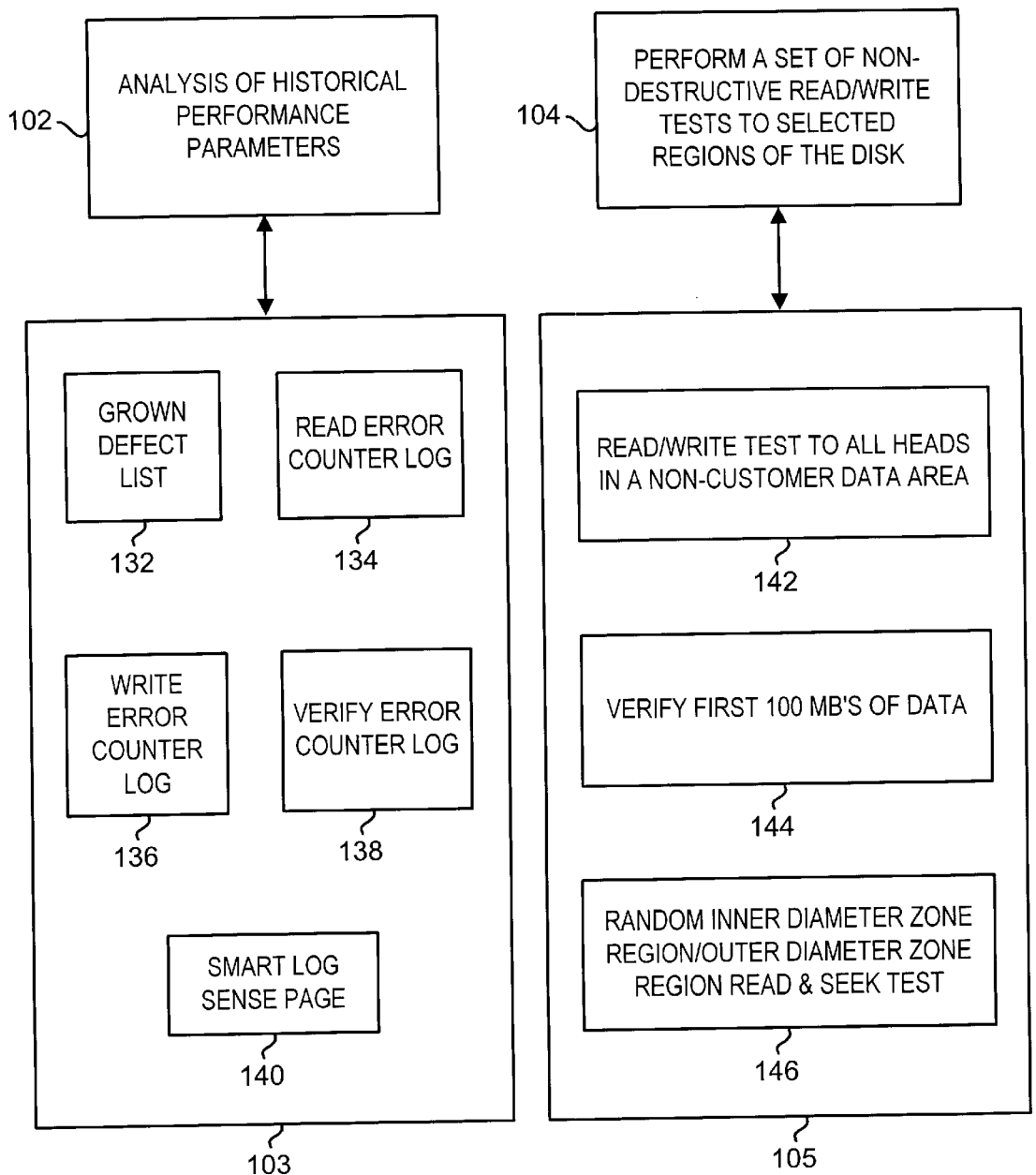
FIG. 5 is a block diagram illustrating the two major test methodologies employed by the present invention, and the individual tests/parameters utilized by each of the methodologies while functionally testing the disk drive.

FIG. 5 is a block diagram illustrating the two major test methodologies employed by the present invention to determine whether a disk drive has experienced an early-life failure, and the individual tests/parameters utilized by each of the methodologies while functionally testing the disk drive. As described previously in FIG. 4, the present invention tests the disk drive by analyzing stored historical performance parameters, as shown at block 102, and performing a set of non-destructive read/write tests to selected regions of the disk, as shown at block 104.

In one embodiment of the present invention, a set of stored historical performance parameters 103 includes: a grown defect list 132, a read error counter log 134, a write error counter log 136, a verify error counter log 138, and a SMART sense log page 140. Each of the set of stored historical performance parameters 103 is described in more detail in the description of FIG. 6.

Figure 6A:
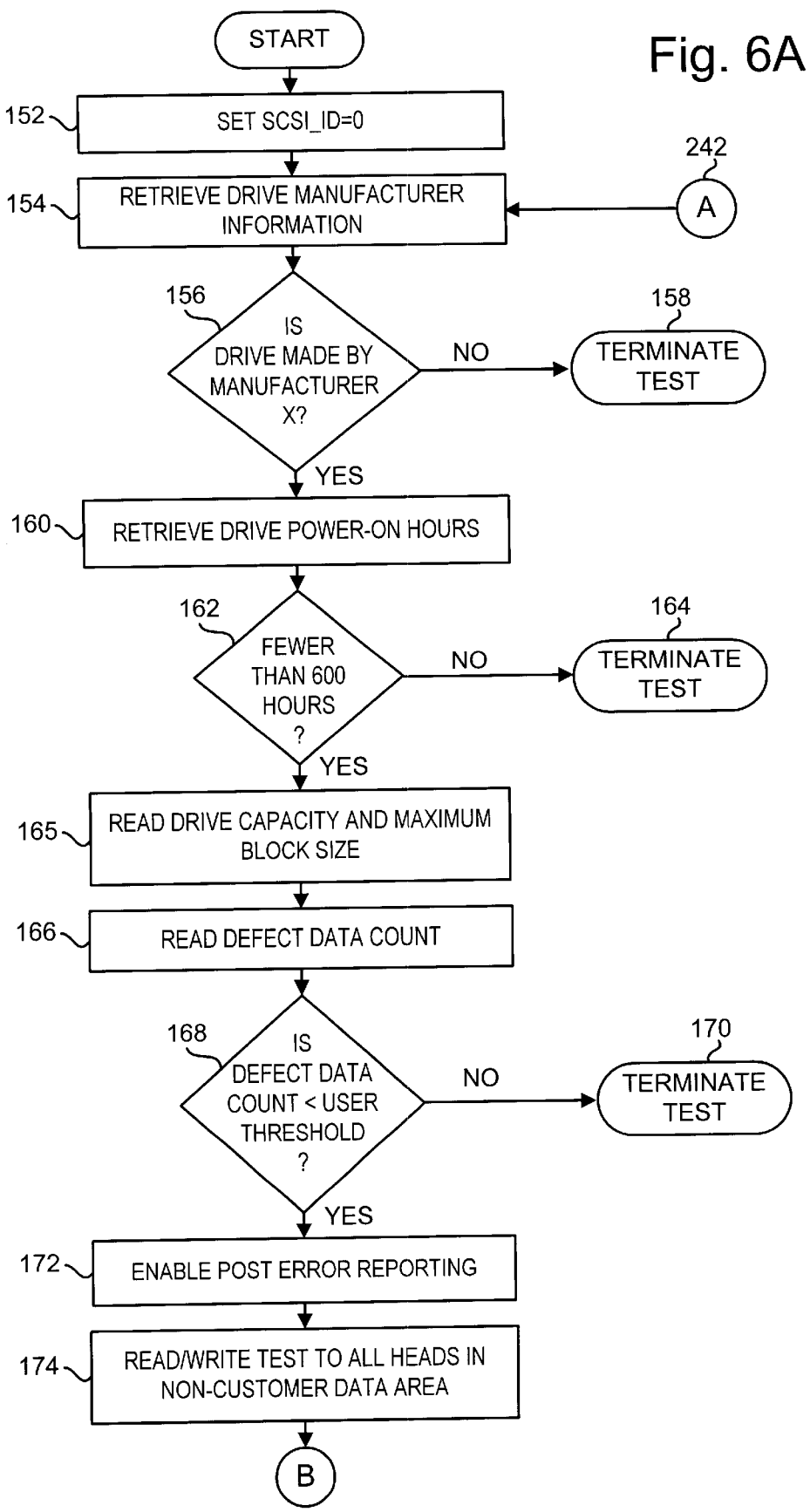
FIGS. 6A, 6B and 6C is an operational flowchart illustrating one exemplary embodiment of a functional testing system of the present invention.
Figure 6B:
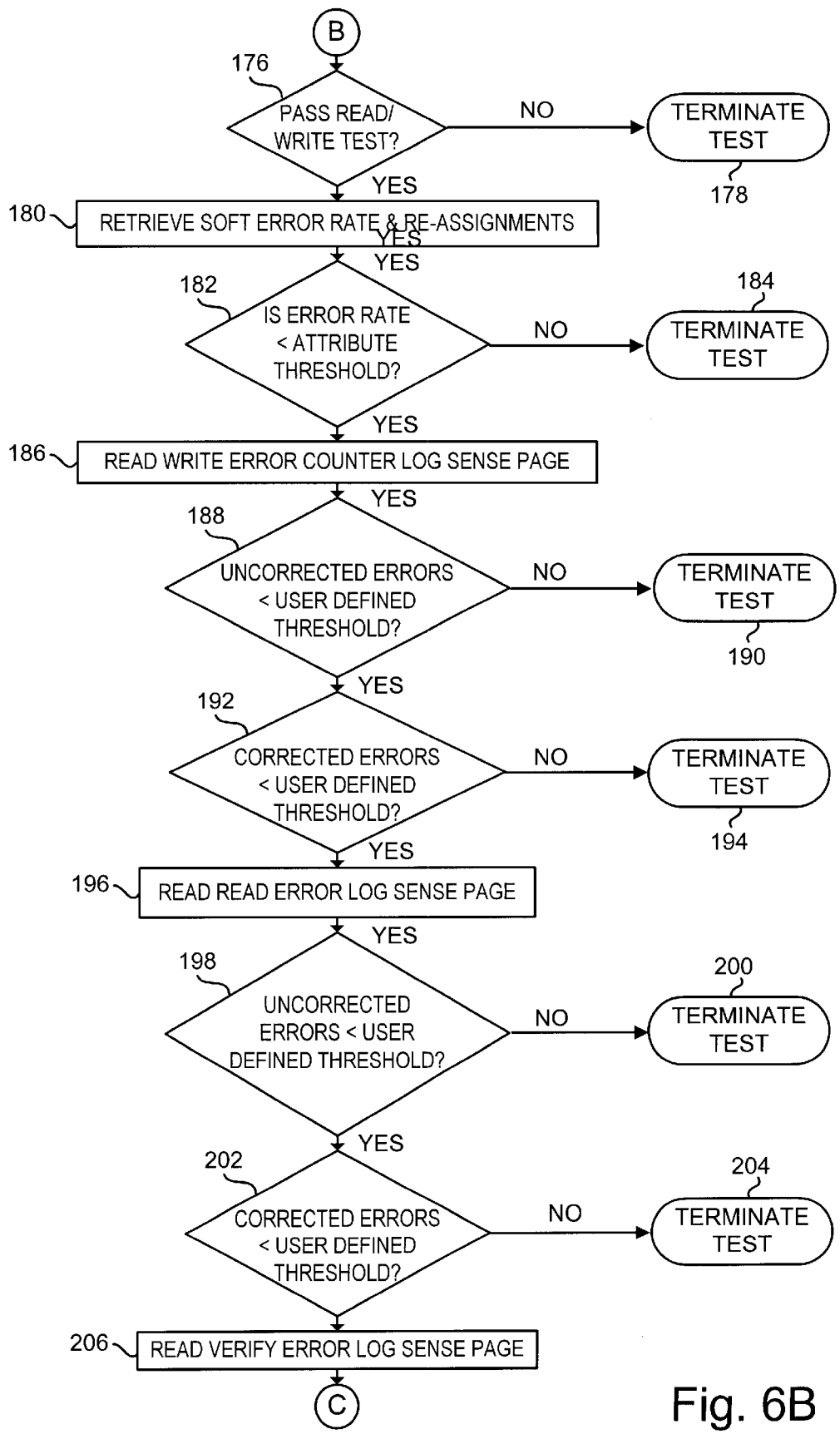
Figure 6C:
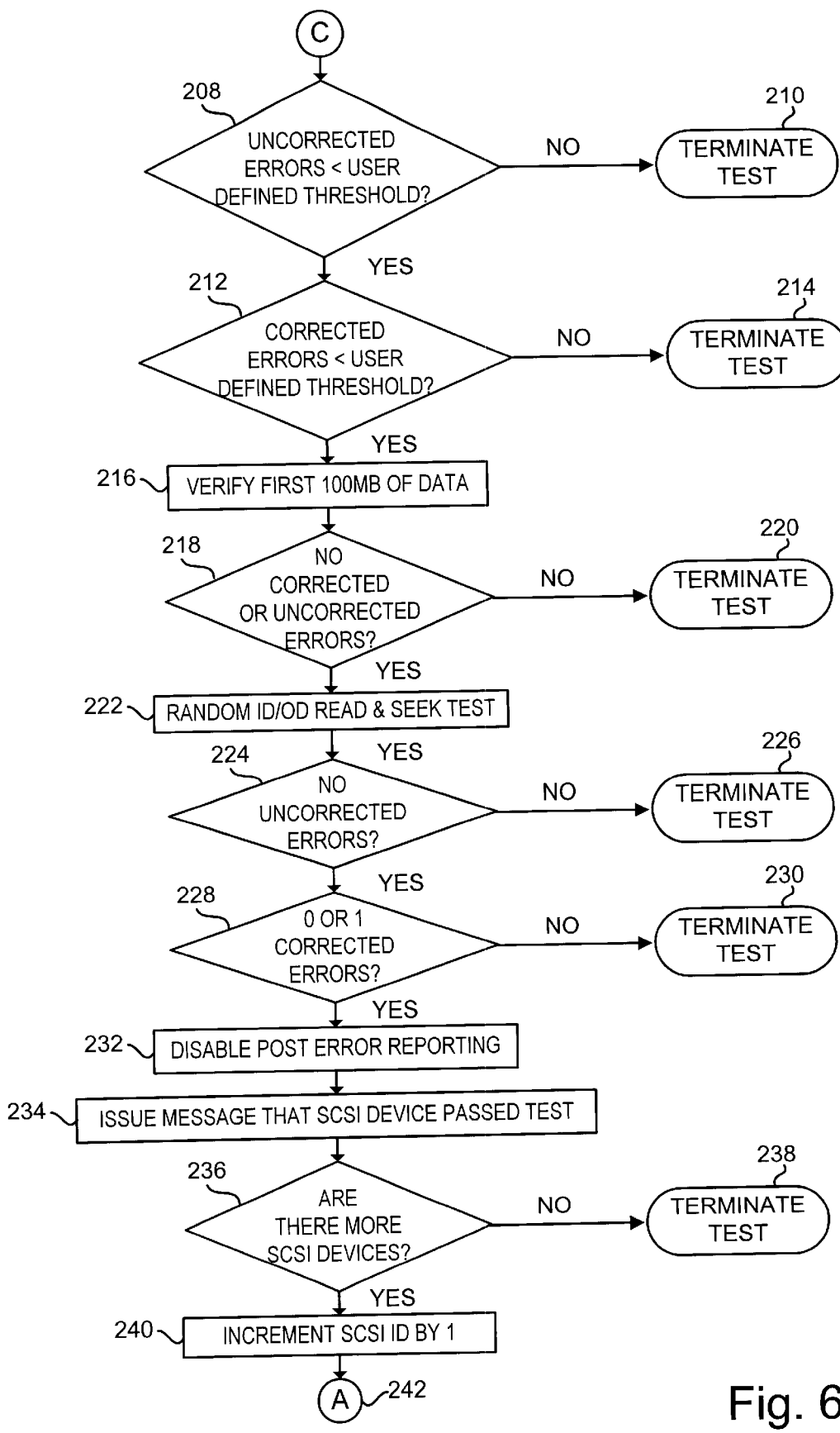

In one embodiment of the present invention, a series of non-destructive read/write tests 105 includes: a read/write test to a non-customer data area of the disk 142 utilizing all heads of the disk drive, a verification test of the first one hundred megabytes of data stored on the disk 144, and a random inner diameter/outer diameter read and seek test 146. Each of the series of non-destructive read/write tests 105 is described in more detail in the description of FIG. 6. FIGS. 6A, 6B and 6C illustrate an operational flowchart of the functional testing system of the present invention. The functional testing system uses SCSI-3 standard commands to query the disk drive under test for operational information. Thus, the functional testing system of the present invention is applicable to the disk drives of any manufacturer adhering to the SCSI-3 specification.

At block 152, functional testing system begins by incrementally scanning the SCSI bus for addresses of disk drives present on the SCSI bus. The variable SCSI_ID is set to the address of the first SCSI disk drive on the SCSI bus. The value of variable SCSI_ID ranges from 0 to 15. RAID channels 0 and 1 are also scanned by the functional testing system of the present invention. RAID allows clustering small inexpensive disk drives into an array such that the array could appear to a computer system as a single large disk drive. Such an array may offer better performance characteristics than a traditional individual hard disk drive.

After the address of the first disk drive present on the SCSI bus has been determined, functional testing system next retrieves drive manufacturer information for the disk drive currently under test, as shown at block 154. At block 156, the retrieved drive manufacturer information is compared against a pre-defined manufacturer value. If the disk drive currently being tested on the SCSI bus has been not been manufactured by the pre-defined manufacturer, the test is terminated, as shown at block 158. Otherwise, the functional test continues by retrieving the disk drive power-on hours, as shown at block 160.

The disk-drive power-on hours are defined to be the number of hours the drive has been in an operational state since manufacture. As stated earlier, the primary purpose of the functional testing system of the present invention is to detect early-life disk drive failures. After the disk-drive power on hours have been retrieved, the power-on hours are compared against a pre-defined hour threshold, as shown at block 162. In the illustrated embodiment, the pre-defined hour threshold is defined to be 600 hours. Thus, if the drive has 600 or more power-on hours, functional testing is terminated, as shown at block 164. If the drive has fewer than 600 power-on hours, functional testing continues.

At block 165, the drive capacity and maximum block size are read from the disk drive. This information is used to divide the disk into 8 equal zone regions, as illustrated previously in FIG. 3. Next, at block 166, the grown defect list (GLIST) is read from a reserved area of the disk in order to determine the number of entries on the GLIST. The GLIST contains unrecoverable errors detected since the formatting of the disk surface. At block 168, if the number of defects on the GLIST exceeds a pre-defined threshold, the drive is marked as defective, and the functional test is terminated, as shown at block 170.

If the number of defects on the GLIST does not exceed the pre-defined threshold, post error reporting is enabled, as shown at block 172. Enabling post error reporting allows soft errors to be reported as they occur. After post error reporting has been enabled, the functional test performs a non-destructive read/write test utilizing all of the heads of the disk drive to data locations in a non-customer data area, as shown at block 174. At block 176, If errors are detected from this test, the disk drive is marked as defective and the functional test is terminated, as shown at block 178. Alternatively, if the drive passes the read/write test, the functional tests next retrieves a selected set of error rate attributes from the Self-Monitoring, Analysis and Report Technology (SMART) log sense page, including soft error rates and reassignments, as shown at 180. SMART is the industry-standard reliability prediction indicator for both IDE/ATA and SCSI hard disk drives. SMART capable disk drives use a variety of different techniques to monitor data availability. For example, a SMART drive might monitor the fly height of the head above the magnetic media. Other SMART drives may monitor additional or different conditions, such as ECC circuitry on the hard drive card or soft error rates. At block 182, If the selected set of error rate attributes on the SMART log sense page exceed predetermined thresholds, the drive is marked as defective, and the functional test is terminated, as shown at block 184.

At block 186, the number of corrected and uncorrected write errors encountered since the disk drive began operation are obtained from the error counter log sense page. A corrected error is also known as a recoverable error. At block 188, if the number of uncorrected write errors exceeds a user-defined threshold, the drive is marked as defective and the test is terminated, as shown at block 190. If the number of uncorrected write errors does not exceed the user defined threshold, the test next determines whether the number of corrected write errors exceeds a user defined threshold, as shown at block 192. If the number of corrected write errors exceeds the user defined threshold, the drive is marked as defective, as shown at block 192, and the test is terminated, as shown at block 194.

Next, at block 196, the number of corrected and uncorrected read errors encountered since the disk drive began operation are obtained from the error counter log sense page. At block 198, if the number of uncorrected read errors exceeds a user defined threshold, the drive is marked as defective and the test is terminated, as shown at block 200. If the number of uncorrected read errors does not exceed the user defined threshold, the test next determines whether the number of corrected read errors exceeds a user defined threshold, as shown at block 202. If the number of corrected read errors exceeds the user-defined threshold, the drive is marked as defective, as shown at block 204.

At block 206, the number of corrected and uncorrected verify errors encountered since the disk drive began operation are obtained from the error counter log sense page. At block 208, if the number of uncorrected verify errors exceeds a user defined threshold, the drive is marked as defective and the test is terminated, as shown at block 210. If the number of uncorrected verify errors does not exceed the user defined threshold, the test next determines whether the number of corrected verify errors exceeds a user defined threshold, as shown at block 212. If the number of corrected verify errors exceeds the user-defined threshold, the drive is marked as defective, as shown at block 214.

Next, a functional test is run to verify the first 100 megabytes of data on the drive, as shown at block 216. The first 100 megabytes of data on the disk drive often contains critical data such as the operating system for the computer system. At block 218, if any corrected or uncorrected errors are encountered while verifying the first 100 megabytes of data, the disk drive is marked as defective, as shown at block 230.

If the functional test verifying the first 100 megabytes of data on the drive is successful, a functional test to randomly read and seek data at the inner and outer diameters of the disk is performed, as shown at block 222. This test is described in more detail in FIG. 7. At block 224, if one or more uncorrected errors are encountered while performing the random inner diameter zone region/outer diameter zone region read and seek test, the drive is marked as defective, and the test is terminated, as shown at block 226. At block 228, if two or more errors are encountered while performing the random inner diameter/outer diameter read and seek test, the drive is marked as defective, and the test is terminated as shown at block 230.

Next, post error reporting is disabled, as shown at block 232. At block 234, a message is issued that the SCSI drive currently under test has passed the test. At block 236, it is determined whether there are any additional SCSI disk drives to test. If no additional SCSI disk drives remain, the test is terminated at block 238, else the SCSI_ID is incremented by 1 as shown in block 240, and control is passed back to block 154 (retrieve drive manufacturer information) via block 242.

Figure 7:
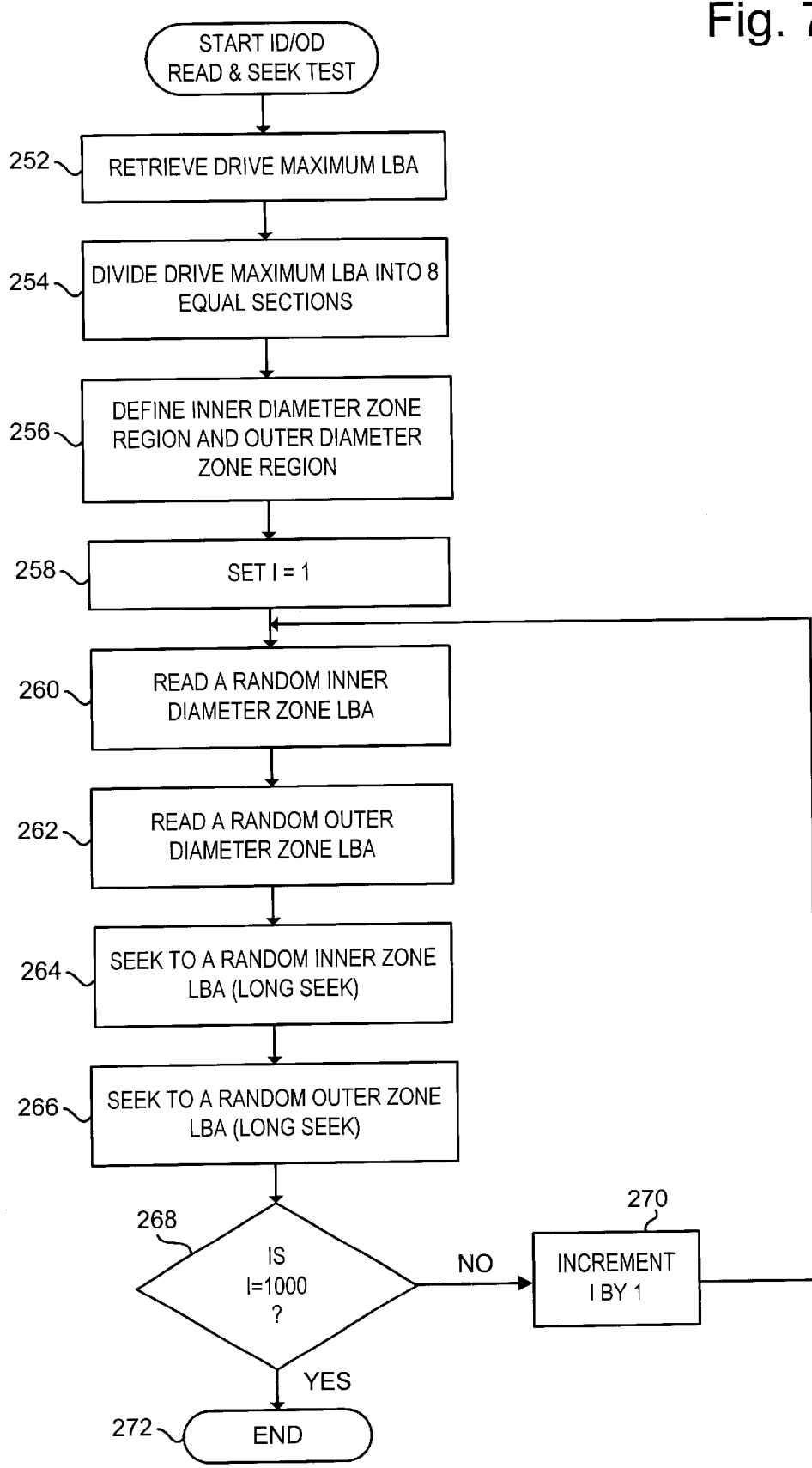
FIG. 7 illustrates a detailed operational flowchart of the random inner diameter zone region/outer diameter zone region read and seek test introduced in FIG. 6C.

FIG. 7 illustrates a detailed operational flowchart of the random inner diameter zone region/outer diameter zone region read/seek test introduced in FIG. 6C. The random inner diameter zone region/outer diameter zone region read/seek test begins by retrieving the maximum LBA for the drive under test, as shown at block 252. At block 254, the maximum LBA is then divided by eight in order to define eight concentric zone regions, with each zone region containing approximately one-eighth of the LBA's for the drive. At block 256, the inner three zone regions (zone regions 6, 7, and 8) are defined as the inner diameter zone region (FIG. 3, element 96) and the outer zone region (zone 1) is defined as the outer diameter zone region (FIG. 3, element 98). At block 258, a loop counter is initialized to 1. The subsequent loop will be performed 1000 times. At block 260, a random inner diameter zone region LBA is read. Next, at block 262 a random outer diameter zone region LBA is read. At block 264, a long seek operation is performed to a random inner diameter zone region LBA. Next, at block 266, a second long seek operation is performed to a random outer diameter zone region LBA. At block 268, the body of the loop is terminated by performing a test to determine whether the value of the loop counter is 1000. If the value is not 1000, the loop counter is incremented by one at block 270, and control returns to block 260. Otherwise, if the value of the loop counter is 1000, the random inner diameter zone region/outer diameter zone region read/seek test is terminated, as shown at block 272.

I claim:

1. A method of functionally testing a potentially defective disk drive having data sites on a disk for recording data thereon, the disk drive storing a plurality of historical performance parameters for continuously logging problems during the operation of the disk drive, the method comprising the steps of:

performing an analysis of stored historical performance parameters, comprising the steps of:

defining a set of performance thresholds associated with each of the plurality of stored historical performance parameters;

retrieving the stored plurality of historical performance parameters;

comparing the value of each of the plurality of historical performance parameters against its associated performance threshold; and marking the disk drive as a failed disk drive if the value of the historical performance parameter exceeds the associated performance threshold, else performing a set of non-destructive read/write tests to selected regions of the disk, comprising the steps of:

defining a set of performance thresholds associated with each of the sets of non-destructive read/write tests;

running the set of non-destructive read/write tests, generating a set of results;

comparing the results of each of the non-destructive read/write tests against the associated performance threshold; and marking the disk drive as a failed disk drive if the results of the non-destructive read/write tests exceed the associated performance threshold.

2. The method of claim 1, wherein the functional testing method retrieves a power-on time parameter value from the disk drive, compares the power-on time parameter value against a user defined threshold value, and if power-on time parameter value exceeds the user defined threshold value, the functional test is terminated.

3. The method of claim 2, wherein the power-on time parameter value is 600 hours.

4. The method of claim 1, wherein the functional testing method includes issuing commands to the disk drive which are compliant with SCSI-3 specifications.

5. The method of claim 1, wherein the plurality of historical performance parameters include counts of soft error rates and reassignments.

6. The method of claim 1, wherein the plurality of historical performance parameters include counts of corrected and uncorrected errors encountered during read, write, and verify operations to the disk drive.

7. The method of claim 1, wherein the plurality of historical performance parameters includes the number of entries found on the grown defect list (GLIST).

8. The method of claim 1, wherein the set of non-destructive read/write tests includes a read/write test of a known pattern to all disk drive heads in a non-customer data area.

9. The method of claim 1, wherein the set of non-destructive read/write tests includes a verification test of the first 100 megabytes of data on the disk drive.

10. The method of claim 1, wherein a function is provided for obtaining the data capacity and maximum logical block address (LBA) of the disk drive under test.

11. The method of claim 10, wherein an inner diameter zone region of the disk drive is defined by the range of logical block addresses from (maximum LBA/8)*5 to maximum LBA.

12. The method of claim 11, wherein an outer diameter zone region of the disk drive is defined by the range of logical block addresses from 0 to (maximum LBA/8).

13. The method of claim 12, wherein the set of non-destructive read/write tests includes a series of random inner diameter zone region/outer diameter zone region read and seek tests.

14. The method of claim 13, wherein each series of random inner diameter zone region/outer diameter zone region read and seek tests comprises: a random read operation to an inner diameter zone region LBA, followed by a random read operation to an outer diameter zone region LBA, followed by a seek to a random inner diameter zone region LBA, followed by a seek to a random outer zone region LBA.

15. The method of claim 1, wherein the time required to functionally test the disk drive is independent of the capacity of the drive.

16. The method of claim 15, wherein the time required to functionally test the disk drive is approximately 2 minutes.

17. The method of claim 1, wherein the functional testing method retrieves a manufacturer name from the disk drive, compares the retrieved manufacturer name against one or more user supplied manufacturer names, and terminates the functional test if the retrieved manufacturer name does not match any of the one or more user supplied manufacturer names.

18. The method of claim 1, wherein the functional test resides in software.

19. The method of claim 1, wherein the functional test resides in firmware.

20. The method of claim 1, wherein the disk drive is a SCSI disk drive.

\* \* \* \* \*